United States Patent

[11] 3,548,895

[72] Inventor Curtis A. Gentry, Jr.
 Okaloosa, Fla.
[21] Appl. No. 690,207
[22] Filed Dec. 13, 1967
[45] Patented Dec. 22, 1970
[73] Assignee International Paper Company
 New York, N.Y.
 a corporation of New York

[54] APPARATUS FOR BUNDLING PULPWOOD
 7 Claims, 17 Drawing Figs.
[52] U.S. Cl. ................................................. 143/46,
 198/27; 214/6, 214/41
[51] Int. Cl. ................................................. B65g 57/11
[50] Field of Search ................................. 214/6P, 6K,
 6H, 6M, 6D; 198/27; 143/46

[56] References Cited
UNITED STATES PATENTS
| 2,065,674 | 12/1936 | Fay, Jr. | 214/6(H) |
| 2,413,979 | 1/1947 | Lamb | 214/6(H)X |
| 2,895,624 | 7/1959 | Oster, Jr. | 214/6(H) |
| 2,915,202 | 12/1959 | Aitken | 214/6(K) |
| 3,122,241 | 2/1964 | Lawson, Sr. | 214/6(K) |
| 3,142,389 | 7/1964 | Bolt | 214/6(P) |
| 3,176,858 | 4/1965 | Johnson | 214/6(P) |
| 3,182,823 | 5/1965 | Chasar | 214/16.4 |
| 3,393,812 | 7/1968 | Mayo et al. | 214/6(K) |
| 3,430,749 | 3/1969 | Ferrari | 214/6(H) |
| 3,129,805 | 4/1964 | Krahn et al. | 198/27X |

Primary Examiner—Gerald M. Forlenza
Assistant Examiner—Robert J. Spar
Attorney—Charles B. Smith ABSTRACT: Apparatus for stacking cut tree sections that includes a conveyor for moving a tree length, delimbed tree in an axial path, saws for cutting the tree into sections, a second conveyor substantially transverse to said axial path, a transfer cradle and actuating means for transferring cut sections from the first to the second conveyor, a shuttle car at the end of the second conveyor for receiving cut sections and for discharging and stacking the cut sections substantially side-by-side and in horizontal rows, one on the other, cradle means for receiving the stack and arms on the cradle for receiving and lowering the stacked sections in the cradle.

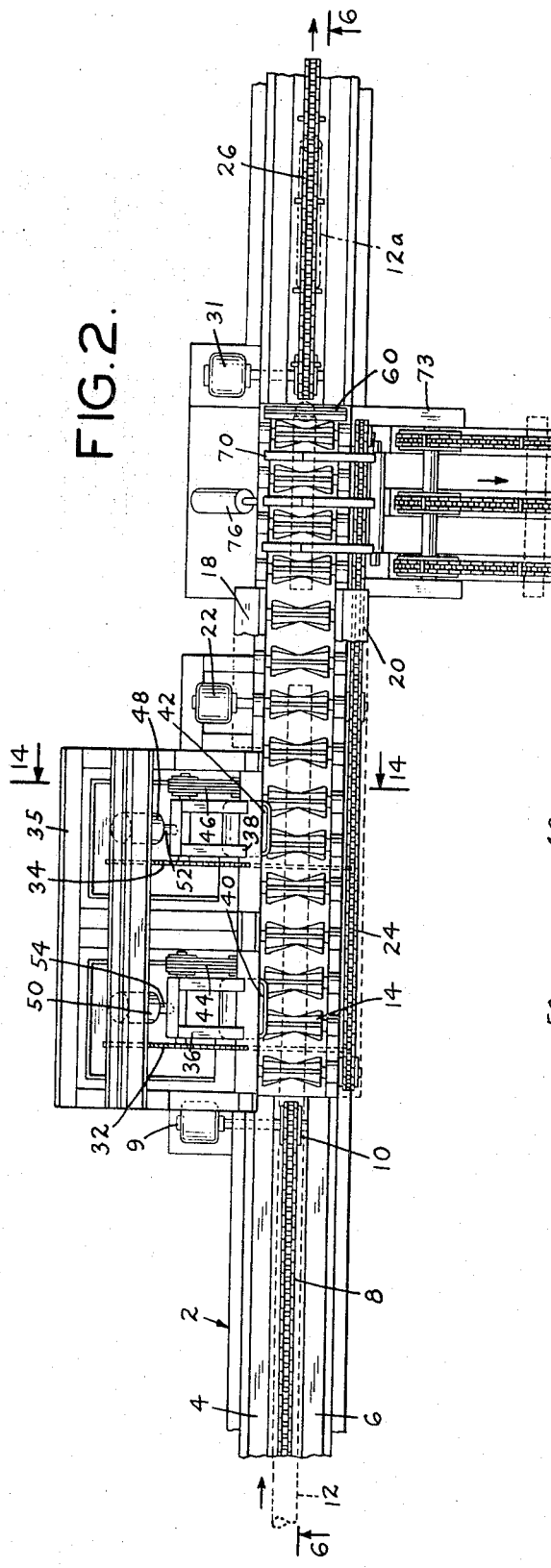
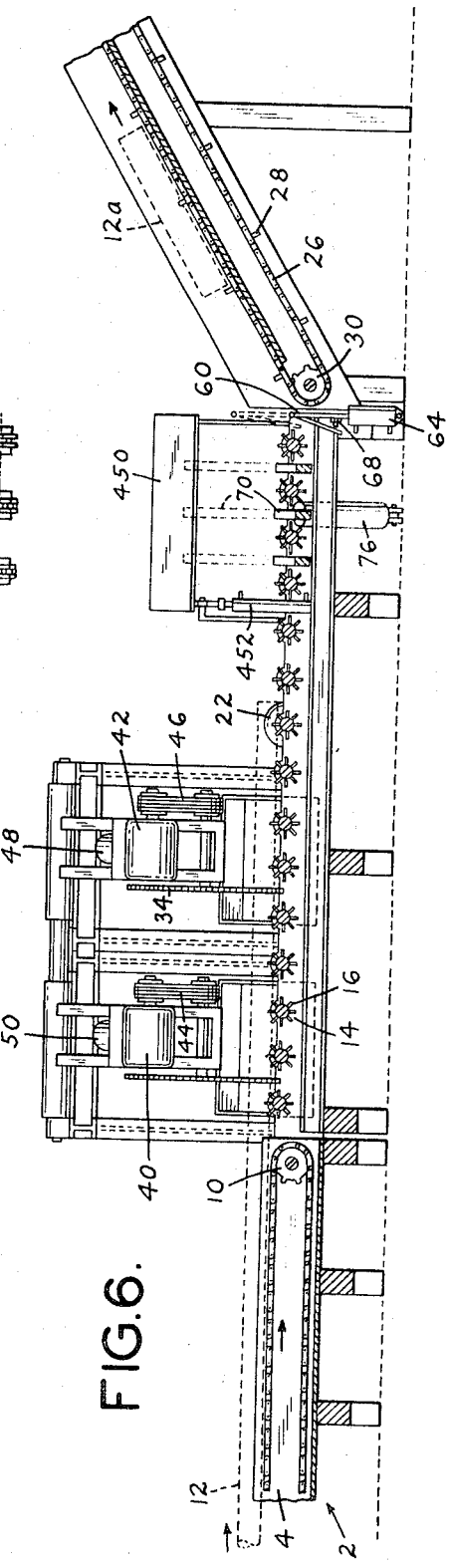

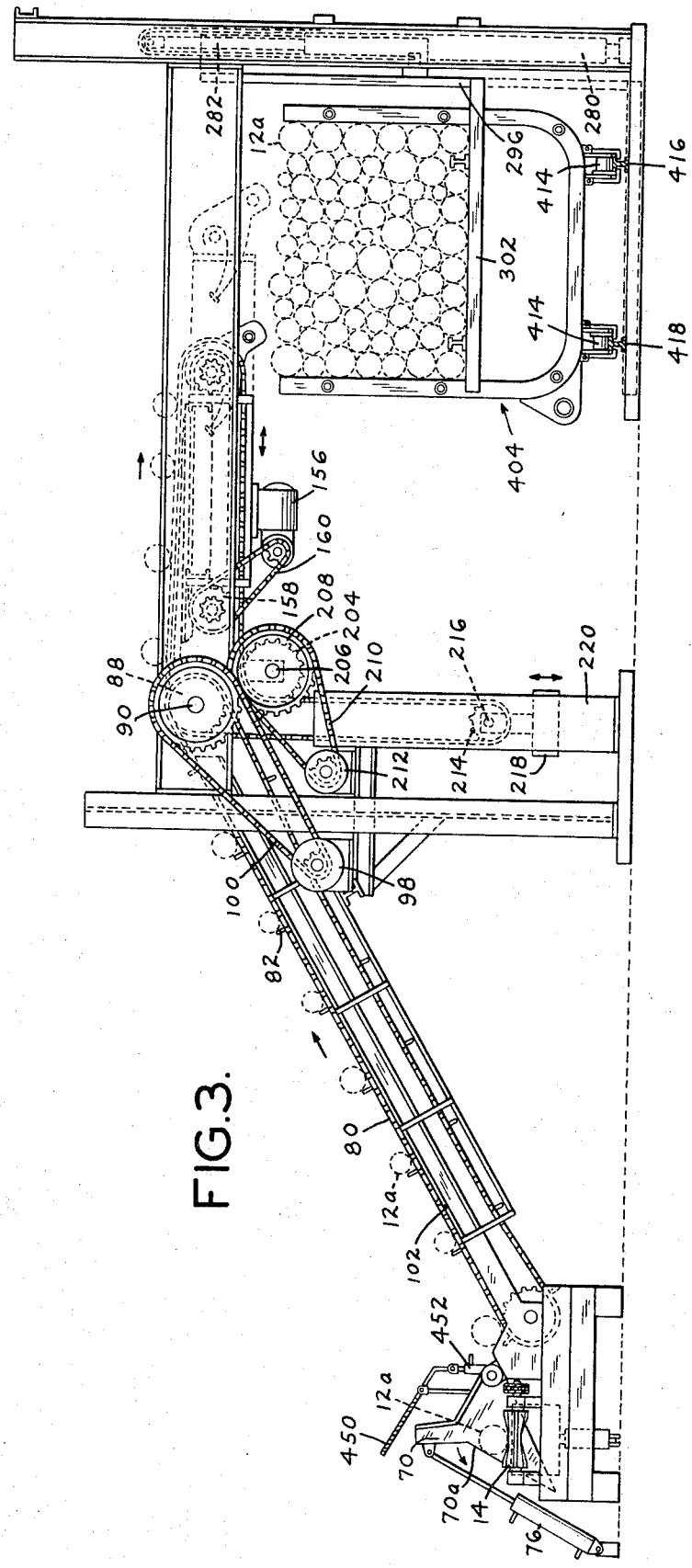

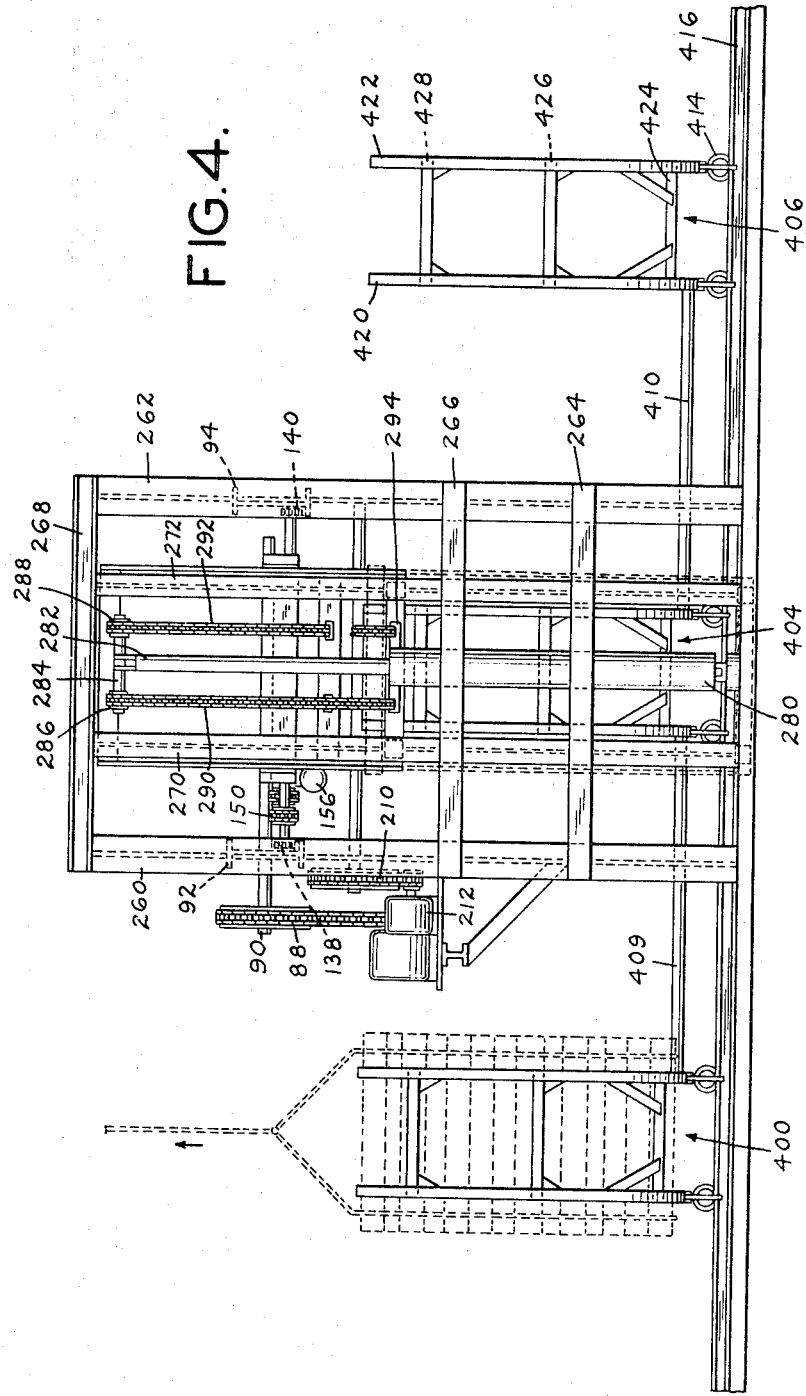

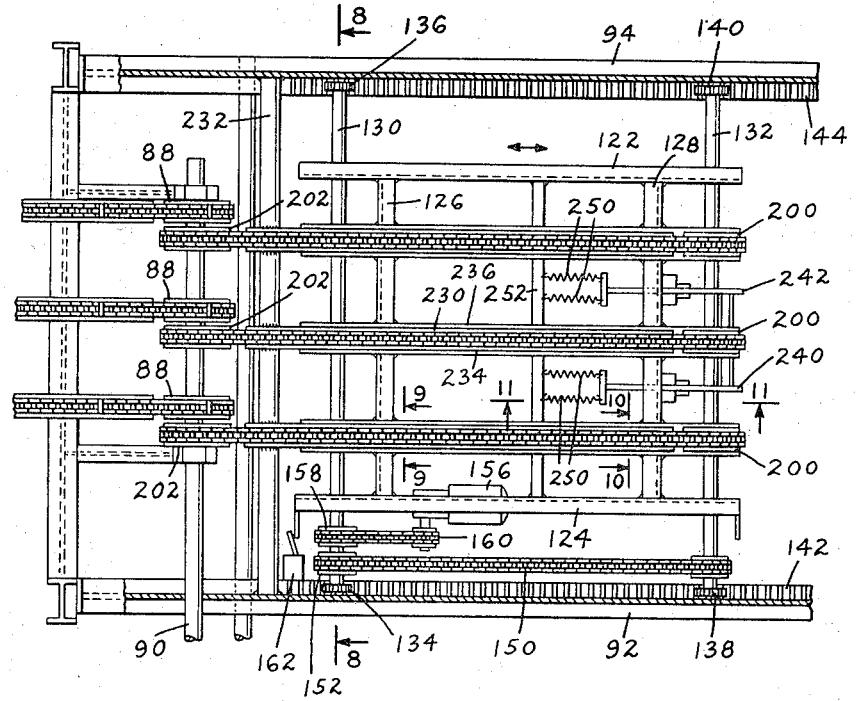
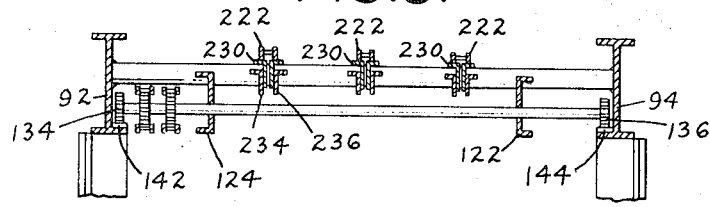
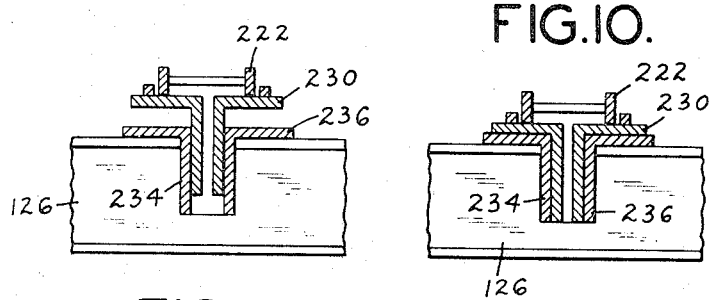
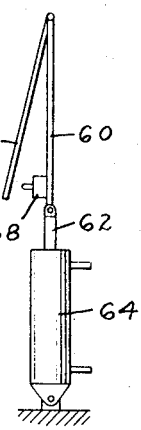

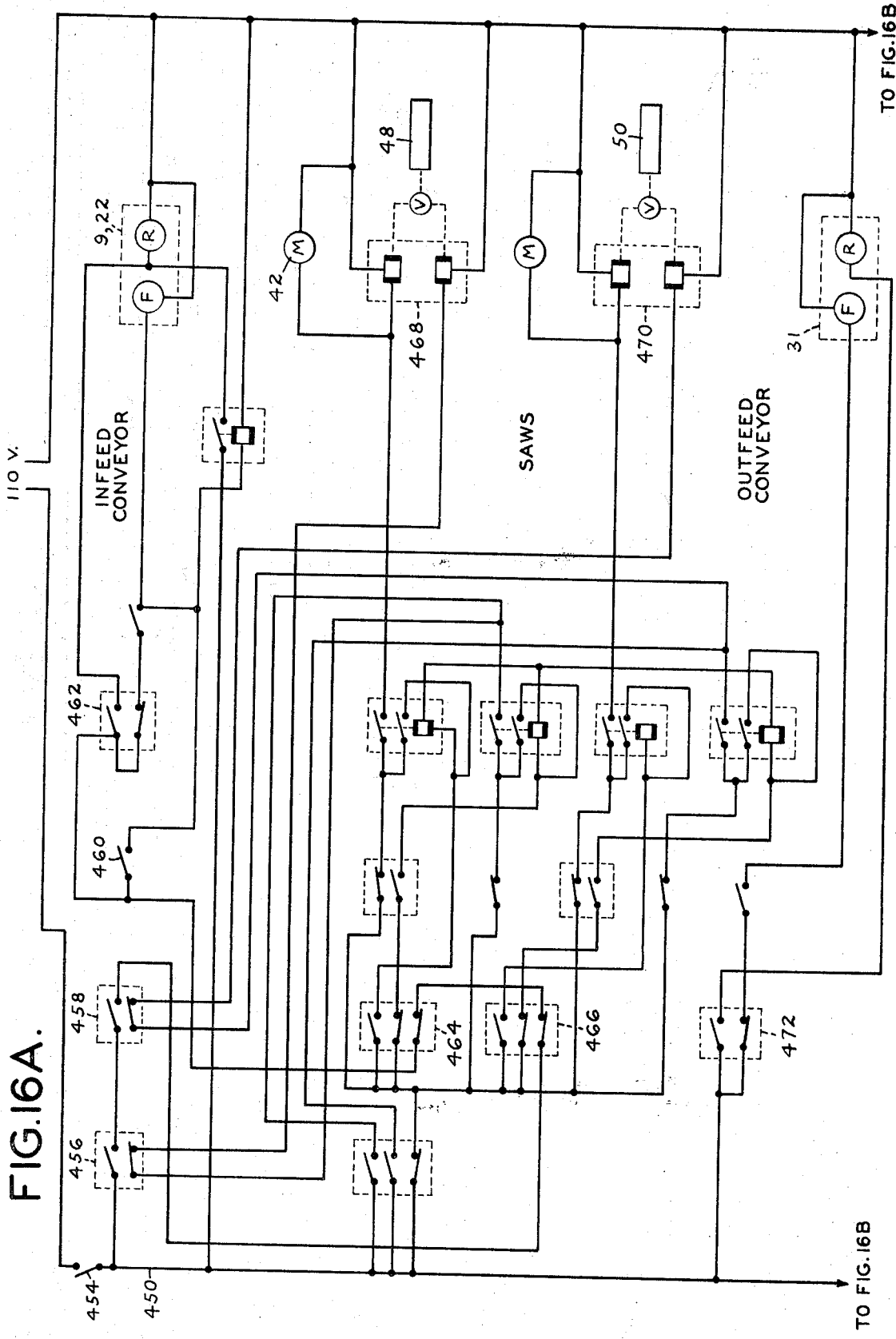

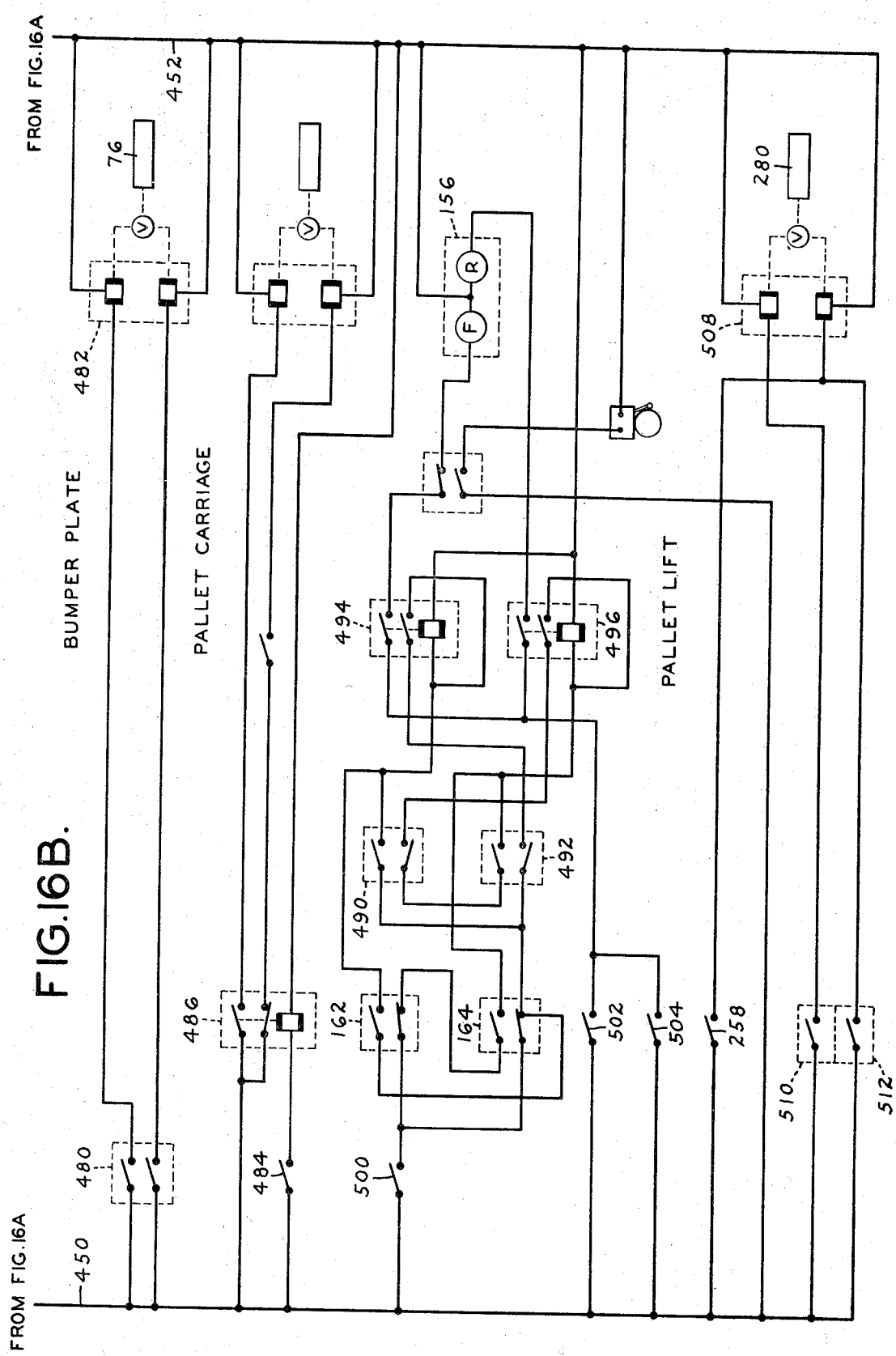

APPARATUS FOR BUNDLING PULPWOOD

BACKGROUND OF THE INVENTION

This invention relates to a machine for cutting and stacking wood and, more particularly, for cutting and stacking pulp wood for use in paper-making.

Trees for use in paper-making are felled in the forest, delimbed and, prior hereto, have been cut into lengths, for example, 6 feet, stacked on a vehicle, such as a truck, and hauled to the paper mill or collection point. At the collection point, the stack of wood is lifted off the vehicle, or truck.

Because of shortage of labor and costs, more recently, the practice has developed of delivering delimbed trees to the paper mill, or collection point, in tree lengths. In other words, the tree, after it is felled, is not cut into lengths but, rather, is left intact and delivered to the paper mill, or collection point in full tree length. When such tree length units are received at the plant, or collection point, the delimbed tree is fed on a conveyor through saws which cut the tree into lengths, for example 6 feet, and pile the cut sections, randomly into a pile.

The volume of trees that can be fed by a conveyor through a saw, cut and randomly piled, is substantial. However, where the cut lengths are collected at a point removed from the paper mill and are then shipped to the mill by barge, or rail, random piling of the cut sections has presented a problem.

Where the wood is collected and shipped to the paper mill by barge, flat barges are used. The cut tree sections are loaded onto the top of the barge and, when loaded, the barge moves the logs from the collection point to the paper mill. The amount of cut sections that can be loaded in random piles onto a barge is, of course, limited. Hence, it is the practice to stack the cut wood along the sides and ends of the barge and to fill the area between the stacks with random piles. The stacked sections at the sides and ends of the barge form sides around the barge and keep the randomly piled sections from sliding off the barge.

When the trees are cut into sections in the woods and stacked on a vehicle, such as a truck, for delivery to the collection point, the stacked piles of wood can be lifted with, for example, a crane, off the truck and set on the barge to form sides, or walls, along the sides and ends of the barge. Where, however, the trees are fed, on a conveyor in tree length, cut with saws and piled randomly, the cut sections must then be stacked. Stacking such cut sections adds, substantially, to the cost of the wood.

SUMMARY OF THE INVENTION

In the instant invention, full length delimbed trees are fed, longitudinally, by a conveyor, are cut into lengths, for example, 6 feet, and are then lifted, sidewise or transversely, off of the conveyor and stacked, one layer on the other, on a pallet. After the pallet is full, the stacked cut lengths can then be lifted, by a crane or lift truck, and placed along the sides and ends of the barge. The center of the barge, between the side and end walls thus formed, can then be filled with randomly piled logs fed directly from the end of the longitudinal conveyor.

Rather than placing the stacked lengths directly onto the barge, the stacks can be lifted and placed, in stacks, in convenient areas for later use or, if desired, can be banded or tied in a suitable manner.

The apparatus of the instant invention, in addition to the longitudinal conveyors and saws, includes lifting arms for lifting the cut sections from the longitudinal conveyor and actuating means for the lifting arms, a ramp for moving the cut sections from the longitudinal conveyor to a position above the stack, shuttle mechanism for depositing the cut sections in layers on the stacks, vertically movable arms for receiving the cut sections in layers from the shuttle, means for raising and lowering the movable arms and a cradle for receiving the stacked cut sections and for removing the stacks from the machine.

DESCRIPTION OF THE DRAWINGS

FIG. 2 is a top plan view of a part of the apparatus of FIG. 1 in enlarged detail;

FIG. 3 is a side elevational view of the apparatus of FIG. 1;

FIG. 4 is an end view of the apparatus looking from the right hand end of FIG. 1;

FIG. 6 is a side elevational view, in cross section taken along line 6—6 of FIG. 2;

FIG. 7 is a top plan view of a part of the apparatus of FIG. 1 in enlarged detail;

FIG. 8 is a cross-sectional view taken along line 8—8 of FIG. 7;

FIG. 9 is a cross-sectional view taken along line 9—9 of FIG. 7;

FIG. 10 is a cross-sectional view taken along line 10—10 of FIG. 7;

FIG. 15 is an enlarged view, taken in side elevation, of the transfer actuator of FIG. 6; and FIGS. 16A, 16B is a schematic diagram of circuiting for the instant apparatus, part of the diagram being on 16A and the balance on 16B.

DESCRIPTION OF PREFERRED EMBODIMENT

Figure 1:
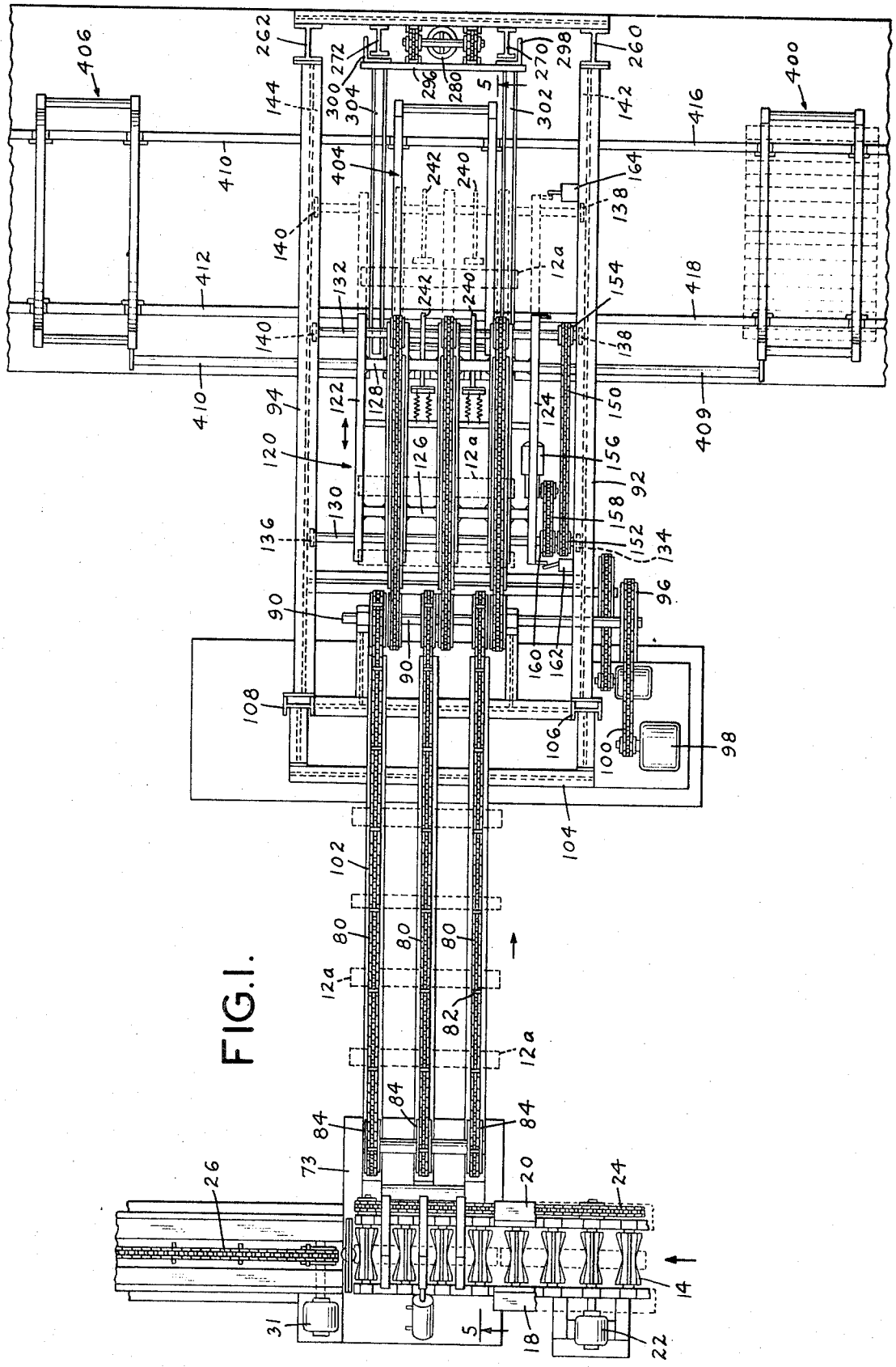
FIG. 1 is a top plan view of the apparatus of the instant invention.

Referring to FIGS. 1, 2 and 3, a conveyor, generally designated 2, having sidewalls 4, 6 sloping inwardly toward chain 8 is driven by motor 9 and sprocket 10 in the direction of the arrow in FIG. 6, for conveying delimbed tree length tree 12 longitudinally in the direction of the arrow in FIGS. 2 and 6, to hourglass shaped rollers 14, having blades 16, and rotatably supported, at their opposite ends, in frames 18, 20. Rollers 14 are driven by motor 22 through chain 24. As the tree length tree is conveyed, longitudinally, by rollers 14, the tree is cut into substantially equal lengths, as will be later described. From the end of rollers 14, cut tree lengths 12a are fed to sloping conveyor chain 26, having lugs 28 and driving mounted on sprocket 30 driven by motor 31 for moving cut lengths 12a upwardly in the sloped direction in the direction of the arrow in FIG. 6. From the upper end of conveyor chain 26, which is not shown, cut lengths 12a are piled randomly.

Figure 14:
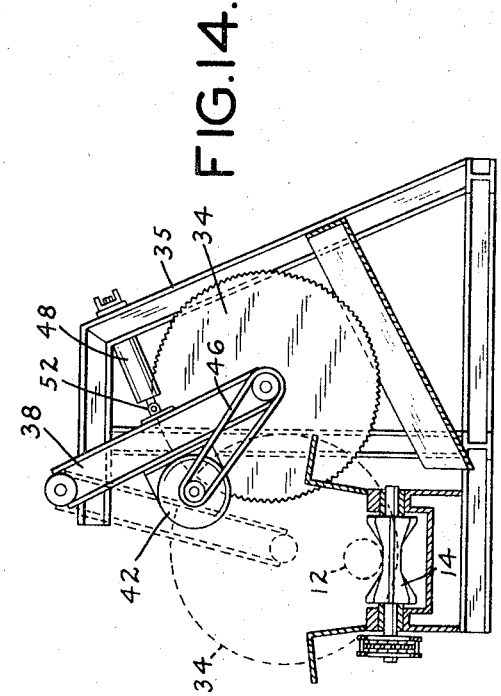
FIG. 14 is a cross-sectional view taken along line 14—14 of FIG. 2.
Figure 11:
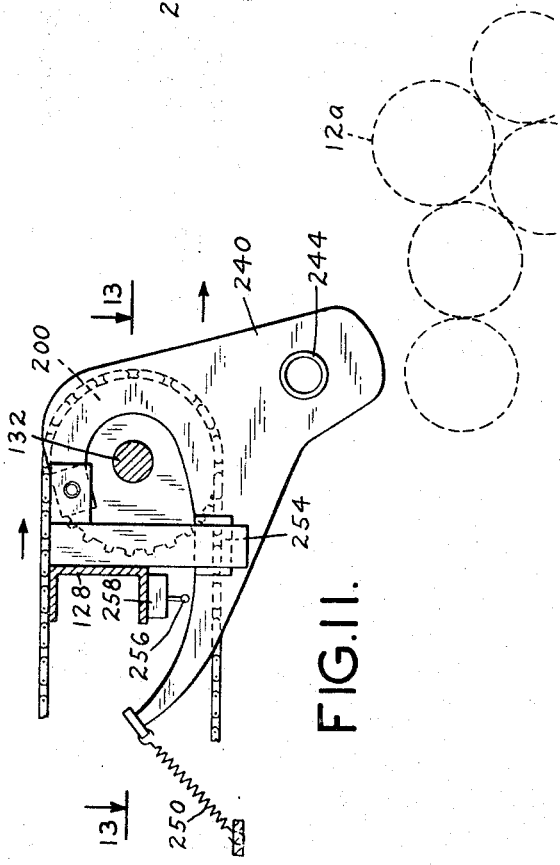
FIG. 11 is a cross-sectional view taken along line 11—11 of FIG. 7.
Figure 13:
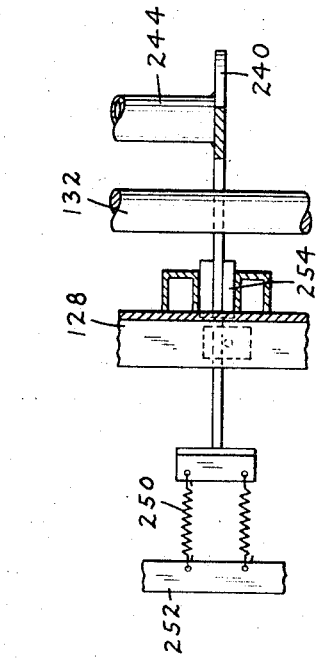
FIG. 13 is a cross-sectional view taken along line 13—13 of FIG. 11.

Referring to FIGS. 2, 6 and 14, saws 32, 34 are pivotally mounted on frame 35 by arms 36, 38 and are driven by motors 40, 42 through belts 44, 46. Hydraulic cylinders 48, 50 are mounted on frame 35 and are connected by piston rods 52, 54 to arms 36, 38, respectively.

In operation, delimbed tree length trees 12 are fed, one-by-one, by conveyor chain 8, longitudinally, in the direction of the arrow FIG. 2, to rollers 14 and, by rollers 14, past saws 32, 34. As the tree length tree 12 is fed past saws 32, 34, the saws are in their retracted, or full line position in FIG. 14. The leading end of tree length tree 12 is fed past both saws so that the length past saw 34 is approximately the length into which the full length tree is to be cut, for example, 6 feet. Conveyor chain 8 and rollers 14 are then stopped by the operator. If the leading end of tree 12 has been fed too far past saw 34, the operator may reverse the drive of conveyor chain 8 and rollers 14 so that the leading end of tree 12 is at the desired distance, for example, 6 feet, beyond saw 34. With conveyor chain 8 and rollers 14 stopped, the operator actuates one or more of the saws 34, 32.

If the length that the full length tree is to be cut is 6 feet and the length of the tree is 12 feet or less, only the saw 34 is actuated. If, however, the length of the full length tree is longer than 12 feet, both saws 34, 32 are actuated. If, of course, the length of the full length tree is longer than 18 feet, which is more commonly the case, the leading end of the tree is cut by both saws and the length that remains is then fed past the saws and cut into the desired length.

With conveyor chain 8 and rollers 14 stopped, the operator actuates either one or both of cylinders 48, 50, causing one or both of the saws 34, 32 to pivot outward on arm 38, 40 across the longitudinal path and cut the tree length in the path of the saw into the desired length. Saw 34, or saws 34, 32 are then retracted to the full line position in FIG. 14 and the operator restarts conveyor chain 8 and rollers 14 to move the cut lengths 12a longitudinally along rollers 14 and onto conveyor chain 26. As this is being done, the following full length tree 12 is brought into position in front of saws 34, 32. Once deposited on conveyor chain 26, the cut length tree sections 12a are conveyed to the end of conveyor chain 26 and dropped, randomly, onto the top of the random pile of cut sections.

The instant invention is not primarily concerned with the cutting of the tree length tree into sections of approximately the same length and in piling the cut sections, randomly, into a pile but, rather, as will now be described, in diverting sections cut into approximately the same length from the longitudinal path and in stacking such cut lengths into stacks.

Referring now to FIGS. 2, 3, 5, 6 and 15, plate 60, connected to piston rod 62 of hydraulic cylinder 64, is positioned between the end of conveyor rolls 14 and conveyor chain 26 and, until raised by cylinder 64, is positioned below rolls 14 out of the path of travel of cut sections 12a from conveyor rolls 14 to conveyor chain 26. When raised, as will be later described, plate 60 is in the path of travel, intercepting cut sections 12a, for purposes to be described. Plate 66 is hinged, at its upper end, to the upper end of plate 60 and solenoid 68 is mounted to the lower end of plate 60 to be closed when plate 66 is pushed against plate 60, as later described.

Figure 5:
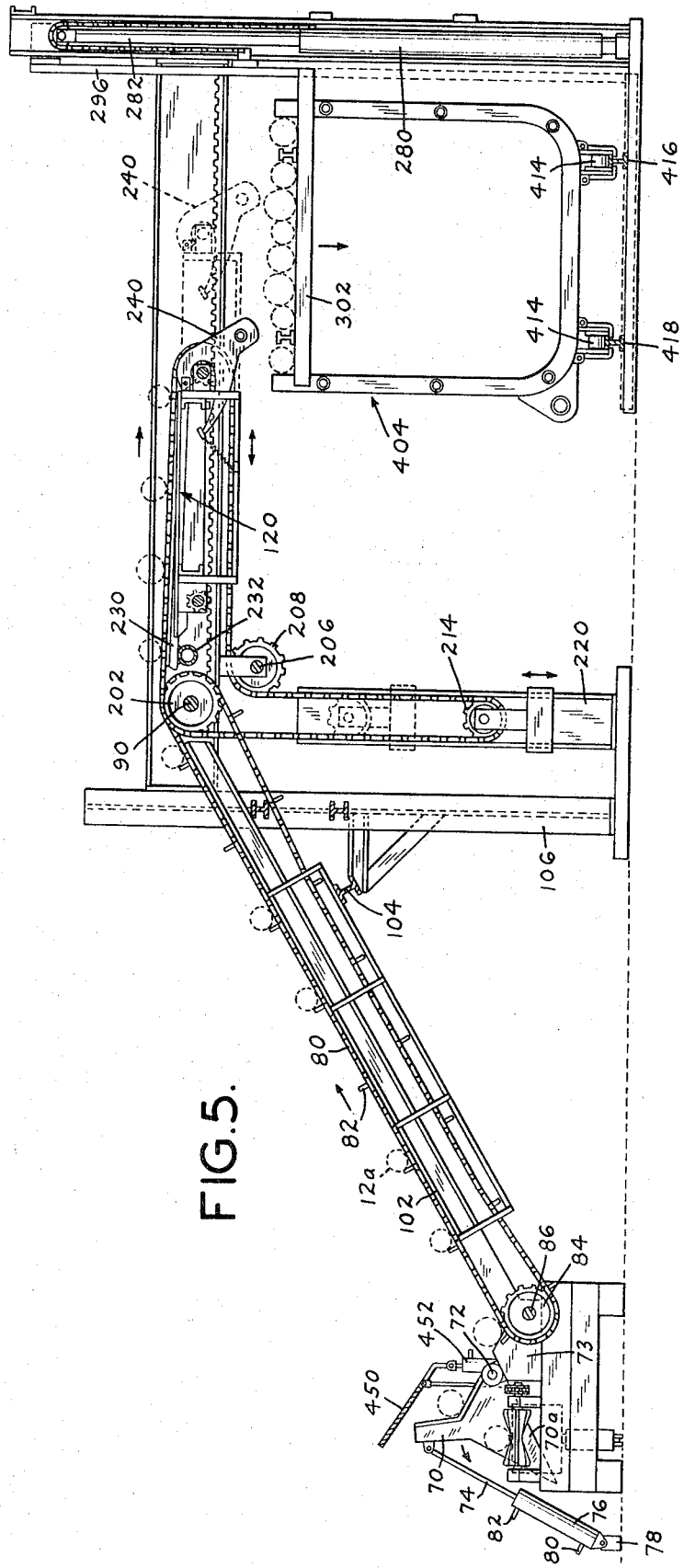
FIG. 5 is a side elevational view similar to FIG. 3 but in cross section taken along line 5—5 of FIG. 1.
Figure 12:
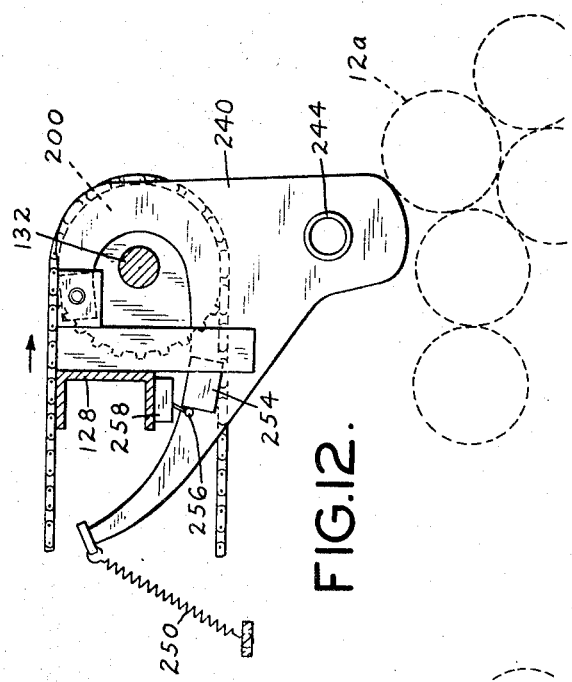
FIG. 12 is a cross-sectional view similar to FIG. 11 but showing the log contacting mechanism in another position.

As best shown in FIGS. 2, 3 and 5, transfer cradle 70 is pivotally connected, at 72, to frame 73 and, at its opposite end, is pivotally connected to piston rod 74, of hydraulic cylinder 76, which, at its opposite end, is pivotally mounted on fixed base 78. Hydraulic cylinder 76 is provided with connections 80, 82, connected through a valve arrangement, not shown, to a source of hydraulic fluid. In FIGS. 3 and 5, transfer cradle 70 is shown in its elevated, or transferring, position. This will be described in greater detail later. For the present, it suffices to say that, when retracted by cylinder 78 and piston rod 74, cradle 70 is pivoted counterclockwise about pivot 72 so that cradle 70 is below the top of rollers 14, allowing rollers 14 to convey cut sections 12a past cradle 70.

Referring now to FIGS. 1, 2, 3 and 5, conveyor chains 80, having lugs 82, and forming an endless loop, pass, at one end of the loop, around sprockets 84 mounted on shaft 86 mounted for rotation on frame 73 and, at the opposite end of the loop, pass around sprockets 88 keyed to shaft 90 mounted for rotation on frames 92, 94, FIG. 1. Sprocket 96 is keyed to one end of shaft 90 and is driven by motor 98 through chain 100. Conveyor chains 80 are supported on frame 102 connected at 104 to vertical legs 106, 108 of frames 92, 94.

Shuttle car, generally designated 120, having longitudinal side members 122, 124 and end members 126, 128, is mounted for movement between frames 92, 94, in the directions of the arrows in FIGS. 1, 3 and 5, on axles 130, 132 on which car 120 is mounted, axle 130 having, at its opposite ends, pinions 134, 136 and axle 132 pinions 138, 140. Pinions 134, 138 are in meshing engagement with rack 142 mounted on frame 92 and pinions 136, 140 are in meshing engagement with rack 144 mounted on frame 94. Axles 130, 132 are interconnected by chain 150 passing endlessly around sprocket 152 keyed to axle 130 and sprocket 154 keyed to axle 132. Shuttle car 120 is driven backward and forward in frames 92, 94 along pinions 136, 140, in the directions of the arrows, by motor 156, mounted on side member 124, endless chain 158 and sprocket 160 keyed to axle 130. Motor 156 is reversible and the reversing of the motor is controlled by switches 162, 164, mounted in fixed position at the opposite ends of the travel of shuttle car 120, on frame 92.

Referring particularly to FIGS. 3, and 7 to 10, sprockets 200 are mounted on axle 132 for rotation thereon but are not keyed thereto and sprockets 202 are similarly mounted on shaft 90 for rotation on, but are not keyed to, shaft 90 for reasons later described. Sprockets 204 are keyed to shaft 206 mounted under frames 92, 94 and shaft 206 and sprockets 204 are driven by sprocket 208 keyed to shaft 206 by chain 210 and motor 212. Floating sprockets 214, mounted on shaft 216 connected to counterweight 218, is mounted for movement in the direction of the arrows in FIGS. 3, 5 on vertical guides 220, for reasons to be described. Endless conveyor chains 222 (FIGS. 1, 5, 7) pass around sprockets 200, 202, 214, and are driven by sprocket 208.

Referring now to FIGS. 7, 8 and 9, conveyor chains 222 ride on and are supported by angle irons 230 fixed, at one of their ends, by welding or other suitable means, to support 232 pivotally mounted, at its opposite ends, on frames 92, 94. At their opposite ends angle irons 230 rest between angle irons 234, 236, recessed in end frame members 126, 128 and extending longitudinally therebetween. As best seen in FIGS. 5, 7, 9 and 10 at their end connected to support 232, angle irons 230 are slightly higher than angle irons 234, 236 on shuttle car 120. Thus, as will be later described, cut sections 12a are conveyed by endless conveyor chains 222 at a slight downward angle from the end of conveyor chains 80.

Referring next to FIGS. 3, 5, 7, and 11 to 13, plates 240, 242, interconnected in fixed space relation by bar 244, welded or otherwise suitably connected at its opposite ends to plates 240, 242 are mounted for pivotal movement on axle 132 and are held, for reasons later described, in their outwardly, forwardly counterclockwise projecting position by springs 250 connected at one end to the arm projecting end of plates 240, 242 and, at their opposite end to cross member 252 fixed to side frames 122, 124. When depressed or moved counterclockwise, as will be later described, lug 254 on plate 240 contacts and moves spring biased toggle 256 on toggle switch 258 mounted on end member 128 of shuttle car 120.

Referring now to FIGS. 1, 3, 4 and 5, as has been described frames 92, 94 are supported at one of their ends by vertical members 106, 108, respectively, and, at their opposite ends are supported by vertical members 260, 262, interconnected, horizontally, by beams 264, 266, 268, FIG. 4. Vertical beams 270, 272 extend upwardly between and parallel to vertical members 260, 262 and are interconnected with each other and the vertical members by horizontal beams 264, 266, 268. Hydraulic cylinder 280, having a piston rod 282, is positioned, vertically, between beams 270, 272 and held in vertical position by horizontal beams 264, 266. Cross arm 284 having at its opposite ends sprockets 286, 288, mounted for rotation thereon, is fixed to the opposite ends of cross arm 284, and chains 290, 292, fixed at one end to flange 294 at the upper end of cylinder 280 and, at their opposite ends, to cross head 296. At its opposite ends cross head 296 has flanges 298, 300 extending rearwardly from the cross head and extending vertically along vertical beams 270, 272 to guide cross head 296. Arms 302, 304 are connected by welding, or other suitable means, to cross head 296 and extend outwardly therefrom for purposes more obvious from the following description.

Cradles, generally designated, 400, 402, 404, connected to each other by tie-bars 406, 408, 410, 412, are mounted for transverse movement by wheels 414 on tracks 416, 418, the supports for the axles of which extend downwardly under the flange of tracks 416, 418, to hold the cradles in place on the tracks when the stacked tree sections are removed therefrom.

As best seen in FIGS. 4 and 5, each of the cradles 400, 404, 406 is made up of "U" shaped members 420, 422, held spaced and cross braced by horizontal members 424, 426, 428. Cradles 400, 404, 406 are open at the top and closed at the bottom.

In the operation of the instant apparatus, cut tree sections 12a are transferred out of the longitudinal feed path of rollers 14 onto conveyor chains 80, are lifted up the sloping path of conveyor chains 80 and transferred to conveyor chains 222 and, by the shuttle movement of shuttle car 120 are stacked in layers onto arms 302 and deposited in the cradle 400, 404, or 406, as the case may be, positioned below the end of shuttle car 120. Before operation is commenced, however, side 450 which, when lowered, extends longitudinally along the side of rollers 14 to prevent cut sections 12a from spilling off of rollers 14, is lifted out of position along the side of rollers 14 to the elevated position shown in FIGS. 3 and 5. Side 450 is lifted, or elevated, by hydraulic cylinder 452.

Arms 302, 304 are elevated, or lifted, by cylinder 280 and piston rod 282 so that the arms 302, 304 are in the elevated position as shown in FIG. 5. Shuttle car 120 is moved, by actuating motor 156 so the car is at its fully extended position, i.e., at the forward end of the frame away from conveyor chain 80.

With side 450 elevated, arms 302, 304 in their raised position and shuttle car 120 at its forward position, plate 60 is raised by piston rod 62, hydraulic cylinder 64 so that plate 60, with hinged plate 66 and solenoid 68 is in the path of travel of cut sections 12a being fed longitudinally by rollers 14. Conveyor chain 8, rollers 14 and saws 32, 34 are in operation. Conveyor chain 8 feeds delimbed, full length trees 12 to conveyor rolls 14 where the tree length tree 12 is cut into lengths as hereinbefore described.

Conveyor rolls 14 are rotated at a speed faster than conveyor chain 8 so that, as the tree length tree 12 is cut into sections, for example, 6 feet long, the sections, as they are cut, accelerate away from the saw, spacing the first cut section 12a from the following cut sections. Motors 98, 96 and 156 are in operation, conveyor chains 80 and 222 are rotating in the direction of the arrows in FIG. 5. When the forward end of the first cut section 12a strikes plate 66 hinged on 70a plate 60, the lower end of plate 66 moves towards plate 60 and actuates solenoid 68. When solenoid 68 is so actuated, fluid pressure is delivered to cylinder 76 and piston rod 74 of cylinder 76 raises transfer cradle 70, pivoting transfer cradle 70 about pivot 72 and transfers cut section 12a from its longitudinal path on conveyor rolls 14 to chain 82. Skirt 70a on transfer cradle 70, as can best be seen in FIGS. 3 and 5, remains in the feed path of rollers 14 so that, if the following section 12a should reach plate 70a before transfer cradle 70 has been retracted by cylinder 76 of piston rod 74 to its position below feed rolls 14, skirt 70a will block further feed of the following section.

Once the cut section 12a is transferred, by transfer cradle 70 from conveyor rolls 14 to conveyor chain 80, cylinder 76 and piston rod 74 return the cradle 70 to its initial position below the feed path of conveyor rolls 14 to receive the next cut section 12a.

As cradle 70 is moving back to its retracted position, below conveyor rolls 14, to receive the next cut section 12a, the section 12a previously transferred is engaged by lugs 82 on conveyor chain 80 and is fed upwardly along the conveyor by conveyor chains 80. The next cut section, contacting and pivotally moving plate 36 towards plate 60 again actuates cylinder 76 and piston rod 74 to transfer the next cut section 12a on to conveyor 80. Thus, cut sections 12a are continuously transferred from the feed path of conveyor rolls 12a to conveyor.

As the cut sections 12a are moved upwardly by conveyor chains 80, the cut sections are discharged from the upper end of conveyor chains 80 on to conveyor chains 222. Conveyor chains 222 move the logs forward across shuttle car 120 and are dropped off the forward end of shuttle car 120 on to elevated arms 302, 304. As the shuttle car moves to the left of FIG. 5, and at the end of conveyor chains 80, the cut sections 12a are discharged in a line, substantially side-by-side across arms 302, 304 between the upstanding ends of members 420, 422.

When shuttle car 120 reaches the end of its travel, toward the end of conveyor 80, shuttle car 120 trips reversing switch 122, reversing motor 156 and reversing the direction of the travel of shuttle car 120 from the direction toward the end of conveyor chain 80 into the direction of travel away from the end of conveyor chain 80. As shuttle car 120 moves in the reverse direction, cut sections 12a continue to be discharged from the end of shuttle car 120 on to arms 302, 304 until shuttle car 120 reaches the end of its travel, contacting reversing switch 164 (FIG. 1) to reverse the direction of travel of shuttle car 120 back toward the end of conveyor chains 80.

As shuttle car 120 shuttles backward and forward across the top of raised arms 302, 304, the pile of cut sections 12a discharged on to the top of arms 302, 304 continues to grow higher. The pile of cut sections does not interfere with the travel of the shuttle car as it is traveling toward the end of conveyor chains 80 and discharging cut section but, when shuttle car 120 reverses its direction, the cut sections piled ahead of plates 240, 242, come into contact with the plates and, because of the forward movement of the shuttle car, pivot plates 240, 242 on axle 132, tensioning springs 250 until lugs 254 on plates 240 contact spring biased toggle 256 on toggle switch 258, closing switch 258. When toggle switch 258 is closed, the hydraulic line to cylinder 280 is opened, retracting piston rod 282 and lowering arms 203, 204 until plates 240 clear the top of the cut sections 12a stacked on the top of arms 302, 304. Thus, arms 302, 304 are automatically lowered to receive further cut sections 12a and shuttle car 120 continues to move backward and forward across the top of cradle 400, 402 or 404, as the case may be, until arms 302, 304 are fully lowered below the bottom of the cradle and the stacked sections 12a rest in the cradle. By manual operation, the operator, operating the saws, can lower arms 302, 304 until the arms are in a position below tracks 416, 418 and the filled cradle can then be moved along tracks 416, 418 from under and to one side of the apparatus and an empty cradle brought into position.

When one cradle is filled and being removed and another cradle is being brought into position, plate 60 can be lowered by hydraulic cylinder 64 and piston rod 62 and the cut sections can be conveyed by conveyor chains 26 and lugs 28 to the random pile of cut sections or the machine can, of course, be shut down.

In the apparatus of the instant invention, the cut sections 12a are transferred from the longitudinal conveyor, conveyed upwardly by conveyor chains 80 and by shuttle car 120 and conveyor chains 222 are automatically stacked. In transferring and stacking the cut sections 12a, it is preferred to maintain the cut sections 12a to be stacked at substantially the same length. Because the trees, received in tree length, are not of the same length, sections at the end of the tree shorter than the desired length may result during the cutting operation and, when this occurs, cut sections 12a shorter than the desired length can be allowed to pass on to conveyor 26 for delivery to the random pile by lowering plate 60 with hydraulic cylinder 64 and piston rod 62. This can be accomplished by the saw operator who, in cutting tree lengths 12 into sections 12a can observe the lengths and, with appropriate electric controls, control cylinder 64 to lower plate 60.

Referring now to FIGS. 16A, 16B wherein the electrical control circuit is shown schematically, electrical power to the apparatus is supplied through wires 450, 452 and controlled by main power switch 454, open when the apparatus is not in operation and closed manually by the operator, for operation of the apparatus.

Limit switches 456, 458 are mounted on saw frame 35 and, when saws 32, 34 are in their retracted, inoperative position, the contacts of switches 456, 458 are held closed by arms 36, 38, respectively. Conveyor motors 9, 22, all controlled through switches 456, 458, and represented as one unit in FIG. 16 for purposes of convenience may be run in the forward direction by the operator by closing switch 460 to feed tree length tree 12 and cut sections 12a forward on infeed conveyors 8, 14, or in the reverse direction by the operator by closing switch 462.

To operate the saws, once tree length tree 12 is in proper position in front of the saws, the operator manually closes one, or both, of switches 464, 466. Closing of switches 464, 466 actuates solenoid 468, 470 and through appropriate valves, hydraulic cylinders 468, 470 to move, one or both, of saws 32, 34 toward tree 12. At the same time, one or both of the saw motors 42, 44, as the case may be, is actuated, driving saws 32, 34. As saws 32, 34 move away from frame 35, switches 456, 458 are opened, opening the circuit to motors 9, 22, and stopping conveyors 8, 14. When saws 32, 34 complete their forward travel, cutting tree 12 into sections 12a, the relays in the circuit reverse the path of fluid pressure to hydraulic cylinders 48, 50, saws 32, 34 return to their initial position and switches 456, 458 are reclosed by the returning saws. When switches 456, 458 close, conveyor motors 9, 22 again drive conveyors 8, 14.

Outfeed conveyor chain 26 may be driven by motor 31 in the forward, or reverse, direction by the operator by manually closing switches 472, 474. Usually, conveyor chain 26 is driven in the forward direction, the reverse direction only being used when one or more of the cut sections 12a on conveyor chain 26 become jammed. The direction of conveyor drive is then reversed to free the cut sections.

With the conveyors and the saws in operation, by selectively manually operating up or down button on switch 40, the operator, through solenoid 482, can raise or lower plate 60, by energizing in the up or down direction hydraulic cylinder 64. With plate 60 raised, a cut tree section 12a, striking plate 66, closes switch 484, causing time delay relay 486 to energize hydraulic cylinder 76 first in one direction to lift transfer cradle 70 to its transfer position and, then, in the opposite direction to lower transfer cradle 70.

As has been noted, shuttle car 120 moves backward and forward on frames 92, 94 between switches 162, 164 and through switches 490, 492, 494, 496, actuates shuttle car motor 156 in the forward and reverse directions. Power to switches 162, 164 and motor 156 is provided by manual closing of switches 500, 502. When initially starting the apparatus, shuttle car 120 is moved to its forward most position by manually closing bypass switch 504 but, as soon as the shuttle car 120 reaches its forwardmost position and actuates switch 164 bypass switch 504 is released.

As hereinbefore described, hydraulic cylinders 280 and 282 control the vertical position of arms 302, 304. Arms 302, 304 can be raised and lowered, by the operator, by manual control of up and down switches 510, 512 which through solenoid 508 control fluid pressure to and from cylinder 280. When a new stack is to be formed, the operator by manual operation of switch 510 lifts arms 302, 304 to the upward position, about twelve inches below the bottom of shuttle car 120. As shuttle car 120 moves forward and plates 240, 242 contact cut sections 12a and are pivoted on axle 132, switch 258 is closed, actuating solenoid 508 and cylinder 280 to lower arms 302, 304 and, when plates 240 clear cut sections 12a, spring 250 opens switch 258. Arms 302, 304 then remain in position until switch 258 is again actuated by plates 240 to actuate solenoid 508 and cylinder 280.

Cradles 400, 404, 406 may be moved into registered position under the discharge end of shuttle car 120 by a winch, cable and reversible electric motor, not shown or in any other convenient manner. When a shuttle car is filled and moved outwardly to either side of the machine, the stacked logs, projecting at their ends from the opposite sides of the cradle may be lifted with, for example, a cable, such as ceiling 600, FIG. 4, operated from a crane or may be lifted out of the cradle by other suitable means.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

I claim:

1. Apparatus for stacking cut tree sections comprising a first conveyor for moving said cut tree sections along an axial path, a second conveyor for moving said cut tree sections along a path substantially transverse to said axial path, said second conveyor having a discharge end, transfer means for receiving and cradling cut tree sections moving in said axial path on said first conveyor and for transferring said cut tree sections from said first conveyor to said second conveyor in a substantially parallel orientation with respect to one another, a shuttle car at the discharge end of said second conveyor, said shuttle car having a receiving end and a discharge end opposed to one another, said receiving end for receiving cut tree sections from said discharge end of said second conveyor and said discharge end of said shuttle car for discharging said cut tree sections from said shuttle car, said shuttle car being movable in a direction parallel to the direction of travel of the cut tree sections and transverse to the longitudinal axis of the cut tree sections, cradle means for receiving said cut tree sections from the discharge end of said shuttle car and vertically movable means in said cradle means for receiving said cut tree sections, said shuttle car including a member mounted for pivotal movement at the discharge end of said shuttle car, said member being biased in a direction forward of the discharge end of said shuttle car, a switch means on said shuttle car which, on pivotal movement of said member towards said shuttle car against said bias, said movement caused by contact with the previously discharged cut tree section uppermost in the stack as the shuttle car is advanced, is contacted by said member to move said vertically movable means downwardly to lower said stacked cut sections in said cradle means, means for imparting reciprocal motion to said shuttle car to move the car in a direction parallel to the direction of motion of the cut tree sections, sensing feedback coupling means connected to said means for imparting reciprocal motion to said shuttle car, said sensing feedback coupling means capable of being activated by the extremities of the field of travel of the shuttle car, so that as said cut tree sections are discharged from said discharge end of said shuttle car said cut tree sections are substantially side-by-side in said cradle means, said means for imparting reciprocal motion to said shuttle car continuously move the shuttle car to discharge the cut tree sections parallel to one another and displaced a predetermined lateral distance from one another and, as said cut tree sections are stacked, one cn the other, said stacked cut sections in said cradle means are lowered.

2. Apparatus as recited in claim 1 in which said first conveyor includes means for cutting a tree-length tree into said tree sections.

3. Apparatus as recited in claim 1 in which said cutting means are saws movably transverse to said first conveyor and means on said saws for stopping said first conveyor when said saws are moved transversely toward said first conveyor and for starting said first conveyor when said saws are moved transversely away from said first conveyor.

4. Apparatus as recited in claim 1 in which said transfer means for receiving and cradling cut tree sections includes a plate, means for moving said plate into and out of said axial path, a transfer cradle to transfer a cut tree section from said first conveyor to said second conveyor when said cut tree section contacts said plate.

5. Apparatus as in claim 4 in which said sensing feedback coupling means includes means at the opposite ends of the travel of said shuttle means for reversibly activating the means for imparting reciprocal motion to said shuttle car.

6. Apparatus as in claim 5 in which said shuttle car is movable toward and away from the of said second conveyor on a track and said means at the opposite ends of travel of said shuttle car are switches which, when contacted by said car reverse the means for imparting reciprocal motion.

7. Apparatus as recited in claim 6 in which said member mounted on said shuttle car includes a plate mounted for pivotal movement at the discharge end of said shuttle car, and the biasing means includes a spring.

IP-1348

PO-1050
(5/69)

UNITED STATES PATENT OFFICE
CERTIFICATE OF CORRECTION

Patent No. __3,548,895__   Dated __December 22, 1970__

Inventor(s) __Curtis A. Gentry, Jr.__

It is certified that error appears in the above-identified patent and that said Letters Patent are hereby corrected as shown below:

Col. 5, line 39, "70a" should read -- raised --;

7, line 42, "forward most" should read -- forwardmost --;

8, line 68, after "the" insert -- end --.

SIGNED AND
SEALED
MAR 16 1971

(SEAL)
Attest:

Edward M. Fletcher, Jr.
Attesting Officer

WILLIAM E. SCHUYLER,
Commissioner of Patents